US007013460B2

(12) United States Patent
Thompson et al.

(10) Patent No.: US 7,013,460 B2
(45) Date of Patent: Mar. 14, 2006

(54) SPECIFYING AN INVARIANT PROPERTY (RANGE OF ADDRESSES) IN THE ANNOTATION IN SOURCE CODE OF THE COMPUTER PROGRAM

(75) Inventors: Carol L. Thompson, San Jose, CA (US); Jeff Littfin, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 811 days.

(21) Appl. No.: 09/858,241

(22) Filed: May 15, 2001

(65) Prior Publication Data

US 2004/0015897 A1      Jan. 22, 2004

(51) Int. Cl.
   *G06F 9/45*      (2006.01)
(52) U.S. Cl. ..................................... 717/161; 717/141
(58) Field of Classification Search ................ 717/127, 717/150, 126, 131, 124; 714/48, 51–53, 714/720, 717–718, 743, 799, 819
   See application file for complete search history.

(56) References Cited

U.S. PATENT DOCUMENTS

| | | | | |
|---|---|---|---|---|
| 4,079,453 A | * | 3/1978 | Dahl ........................... 327/132 |
| 4,584,666 A | * | 4/1986 | Zolnowsky et al. ........... 714/53 |
| 4,667,290 A | * | 5/1987 | Goss et al. ................... 717/147 |
| 4,782,444 A | * | 11/1988 | Munshi et al. ............... 717/153 |
| 5,226,128 A | * | 7/1993 | Rau et al. .................... 712/241 |
| 5,276,819 A | * | 1/1994 | Rau et al. .................... 711/214 |
| 5,361,354 A | * | 11/1994 | Greyzck ...................... 717/160 |
| 5,644,709 A | * | 7/1997 | Austin .......................... 714/53 |
| 5,832,205 A | * | 11/1998 | Kelly et al. .................... 714/53 |
| 5,842,022 A | * | 11/1998 | Nakahira et al. ............. 717/160 |
| 5,953,530 A | * | 9/1999 | Rishi et al. ................... 717/127 |
| 6,078,745 A | * | 6/2000 | De Greef et al. ............. 717/151 |
| 6,128,639 A | * | 10/2000 | Pase ............................ 708/654 |
| 6,129,515 A | * | 10/2000 | Soechting et al. ............ 717/150 |
| 6,151,706 A | * | 11/2000 | Lo et al. ....................... 717/155 |
| 6,199,152 B1 | * | 3/2001 | Kelly et al. ................... 711/207 |
| 6,539,541 B1 | * | 3/2003 | Geva ........................... 717/150 |
| 6,543,012 B1 | * | 4/2003 | Viswanathan et al. ........ 714/50 |
| 6,591,413 B1 | * | 7/2003 | Humphrey et al. ........... 717/125 |

OTHER PUBLICATIONS

Automatic Selection of High-Order Transformations in the IBM XL FORTRAN Compilers, V. Sarkar, IBM Research, 1997, pp. 1-40.*
"Optimizing of Array Subscript Checks", J.M. Asuru, ACM Letters on Programming Languages and Systems, Jun. 1992, pp. 109-118.*
"A Reexamination of Optimization of Array Subscript Range Checks", Wei-Ngan Chin et al, ACM, vol. 17, No. 2, Mar. 1995, pp. 217-227.*
"Elimination of Redundant Array Subscript Range Checks", Priydarshan Kolte et al, ACM, 1995, pp. 270-278.*
"The Range Test: A Dependence Test for Symbolic, Non-linear Expressions", William Blume et al, IEEE, 1994, pp. 528-537.*

(Continued)

*Primary Examiner*—Todd Ingberg

(57) ABSTRACT

Method and apparatus for verifying at runtime an invariant property of a data structure. In various example embodiments, code that verifies whether a runtime value of the data structure is consistent with the invariant property is automatically generated in response to an annotation of the data structure in the source code. In executing the program, the runtime value of the data structure is compared to the invariant property in the automatically generated code. If the runtime property is inconsistent with the invariant property, the program branches to exception handler code.

26 Claims, 2 Drawing Sheets

OTHER PUBLICATIONS

"Application of the Goal Invariant to Structuring of Programs", J.W. Laski, Jan. 1982, ACM, pp. 27-36.*

"Writing an Operating System with Modula-3", Emin Sirer et al, pp. 1-7, Nov. 3, 1995.*

"Compilers Principles, Techniques and Tools", Alfred Aho et al, Sep. 12, 1985, pp. 1-796.*

"Advanced Compiler Design & Implementation", Steven S. Muchnick, Aug. 19, 1997, pp. xxii-xxvi, 43-65, 454-459.*

"Building an Optimizing Compiler", Robert Morgan, Dec. 26, 1997, pp. 204-219.*

"Design of Multi-Invariant Data Strucutres for Robust Shared Accesses in Multiprocessor Systems", I-Ling Yen et al, IEEE, Mar. 2001, pp. 193-207.*

Optimization of Array subscript Range Checks, Jonathan M. Asura, ACM, 1992, pp. 109-118.*

* cited by examiner

SPECIFYING AN INVARIANT PROPERTY (RANGE OF ADDRESSES) IN THE ANNOTATION IN SOURCE CODE OF THE COMPUTER PROGRAM

FIELD OF THE INVENTION

The present invention generally relates to run-time verification of program correctness, and more particularly to compiler-based support for run-time verification of invariant properties of data structures.

BACKGROUND

The values assigned to the various data structures defined in a computer program are often intended to posses invariant properties. For example, a particular variable may be limited to a certain range of values. The invariant property of the variable is that l<=x<=u, where l is the lower bound of the range, u is the upper bound of the range, and x is the value of the variable. Another example is a variable that is constrained to be an aligned pointer to a 32-bit value, i.e. its low-order two bits must be zero.

During program execution, a data structure is updated one or more times with values that depend on the application logic and data input to the application. To protect against events during program execution that may result in data corruption or a fatal program error, application developers often program defensively to avoid these scenarios. For example, input data are checked for acceptable ranges.

While defensive programming catches many error conditions before they can cause serious problems, there may be some events that the developer has not considered. For example, an error in application logic may result in a data structure being assigned a value that is outside the invariant range. To create source code that checks every update to every data structure would unreasonably bloat the source code and make the source code difficult to read. Furthermore, while application developers are often aware of the invariant properties of data structures, compiler and program analysis tools cannot deduce these invariant properties. Thus, the task of guarding against violation of invariant properties is left to the developer.

A method an apparatus that address the aforementioned problems, as well as other related problems, are therefore desirable.

SUMMARY OF THE INVENTION

The invention provides a method and apparatus for verifying invariant properties of data structures of a computer program during program execution. Code that verifies whether a runtime value of the data structure is consistent with the invariant property is automatically generated from an annotation of the data structure in the source code. In executing the program, the runtime value of the data structure is compared to the invariant property in the automatically generated code. If the runtime property is inconsistent with the invariant property, the program branches to exception handler code.

Various example embodiments of the invention are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

The present invention is believed to be applicable to a variety of programming languages and has been found to be particularly useful for compiled programming languages. While the invention is not limited to compiled languages, various aspects of the invention will be appreciated through a discussion of an example embodiment involving compiled languages. Those skilled in the art will appreciate that the invention is also applicable to interpreted languages.

According to one aspect of the invention, selected data structures in the application source code are annotated with respective invariant properties. The term "data structure" refers to both data structures that are language provided (e.g., integers, real numbers, character strings, etc.) and data structures that are user defined and application specific. For each annotation, code is automatically generated to enforce the invariant property, and the code is associated with the data structure. Exception handler code is also automatically generated to handle violations of the invariant property. During execution of the application, the run-time values of the data structures are checked against the invariant properties, and the exception handler code is invoked if an invariant property is violated.

Figure 1:
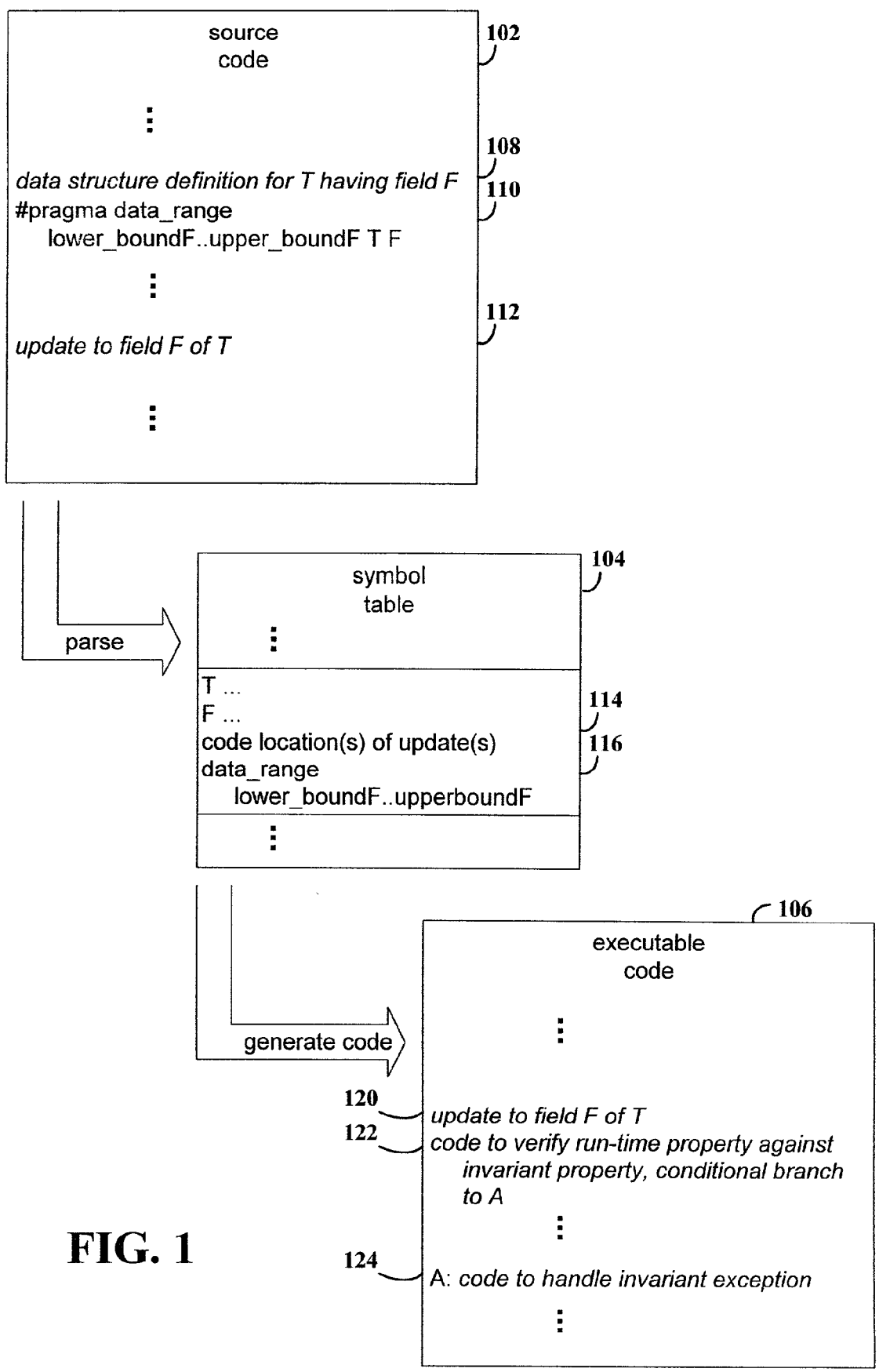
FIG. 1 is a flow diagram that illustrates an example transformation of source code to executable code in accordance with one example embodiment of the invention.

FIG. 1 is a flow diagram that illustrates an example transformation of source code to executable code in accordance with one example embodiment of the invention. Block 102 represents the source code of an application, block 104 represents the symbol table generated in compiling the source code, and block 106 represents the executable code generated during compilation.

Source code 102 includes an example declaration 108 of a data structure, T, having a field, F. An invariant property of the data structure is annotated at reference 110 using the C or C++ language #pragma statement. For field F of the data structure T, the invariant property is a range of data values having a lower bound of lower_boundF and an upper bound of upper_boundF. At reference 112 in the source code, field F of the data structure T is updated.

In a first phase of compiling source code 102, symbol table 104 is generated. Along with the information that is conventionally stored in the symbol table, the invariant properties of data structures as defined in the source code 102 are included. For example, at reference 116, the description of the invariant property for field F of data structure T is included in the symbol table entry. In addition to the description of the invariant property, in one embodiment the code location(s) of the update(s) to the data structure is stored in the symbol table. In an alternative embodiment, the code locations are identified at code generation time based on references to the symbol table for data structures having the invariant property descriptions.

The code generation phase of compilation uses the information from the symbol table 104 to generate executable code 106. At reference 120 in the executable code, field F of data structure T is updated. Following the code that updates the data structure, code is included at reference 122 to check whether the invariant property has been violated. The code to check the invariant property is automatically generated. Included in the code is a conditional branch to the exception handler code at reference 124. The exception handler code is also automatically generated from the invariant annotation.

In addition to the invariant property that is a range of data values, other types of invariant properties include a range of data addresses and a range code addresses. For an invariant property that is a range of data addresses, the generated code checks whether the value in the annotated data structure falls within the valid or specified range of data addresses. Similarly, for an invariant property that is a range of code addresses, the generated code checks whether the value in the annotated data structure falls within the valid or specified range of code addresses. In one embodiment, the developer need not specify the range of valid addresses for code or data address ranges; rather, the compiler determines the valid range of addresses for code or data.

Figure 2:
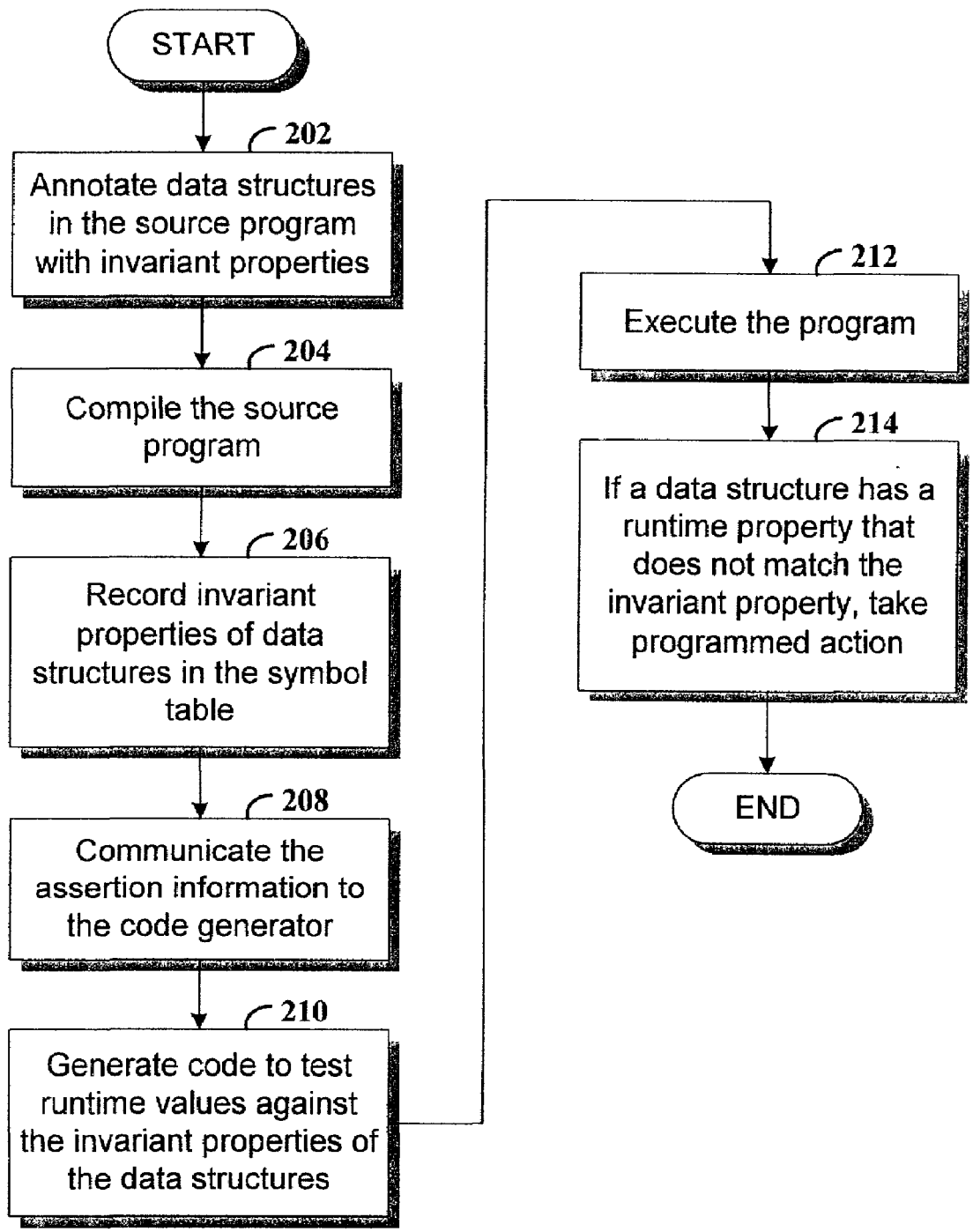
FIG. 2 is a flowchart of a process for verifying invariant properties of data structures at run-time in accordance with one embodiment of the invention.

FIG. 2 is a flowchart of a process for verifying invariant properties of data structures at run-time in accordance with one embodiment of the invention. At step 202, selected data structures in the source code program are annotated with respective invariant properties according to program requirements. In one embodiment, the developer specifies the invariant properties in the source code with language-specific statements. The properties may be specified with a conventional source code editor or a source code editor with language-specific capabilities.

In one example embodiment, invariant property annotations are specified in the C or C++ language with a pragma statement of the form:

pragma property_type [l..u]T<F> where property_type is one of data_address, code_address, or data_range; l and u are the lower and upper bounds of the range; T references a data structure; and <F> is optional depending on whether the data structure T has any fields. The referenced data structure may reference an object of language-provided data type (e.g., integer or character string), an instance of an application-defined type, or all instances of an application-defined type. The code and data address ranges are optional.

At step 204, the source code is compiled, and at step 206 the invariant properties of the data structures are recorded in the symbol table. In addition to storing the invariant properties, at step 208 the initial compilation phase stores in the symbol table the code locations where annotated data structures are updated. The code locations inform the code generator where invariant checks need to be inserted in the executable code. In another embodiment, only the invariant properties are communicated through the symbol table, and the code generator determines where invariant checking needs to be performed based upon statements that update to the annotated data structures.

In yet another embodiment, the annotations of invariant properties are associated with individual variables or objects rather than with a particular data type or class. In this embodiment, the code that checks the invariant properties only checks individual instances rather than all instances of a particular type or class.

At step 210, code is generated to test whether the run-time properties of the data structures satisfy the invariant properties. Each update to an annotated data structure is followed by a check of the run-time property. The code checks whether the value of the data structure lies within the specified range of values. If the range check fails, the action taken depends upon the language. For non-object-oriented languages, the action is to abort the program. For object-oriented languages, the action raises an exception that provides the user with the option to handle the error.

Example pseudocode that describes the code generated to verify the run-time properties is:

```
condition1 = ( a < LowerBoundA )
branch on condition1 to AssertLabelA
condition2 = ( a > UpperBoundA )
branch on condition2 to AssertLabelA
```

Example pseudocode that describes the exception handler for non-object-oriented code is:

```
AssertLabelA:
    print: Variable a outside expected range of type A at
    file foo.c, line 5
    print: Assertion declared in file foo.h, line 20
```

Example pseudocode that describes the exception handler for object-oriented code is:

```
AssertLabelA:
    create an AssertionException object, with the variable
    name and source location of the update, along with the
    information about the assertion (e.g. class name and
    where the assertion was declared) , and throw that
    exception.
```

At step 212, the program is executed. If during program execution the run-time property of a data structure does not comply with the invariant property, the program is directed to the exception handler code, as shown by step 214.

In another embodiment, the number of segments of code that are generated to check invariant properties can be controlled either by the compiler or by a developer-selected threshold. These techniques are described following patents/applications, which assigned to the assignee of the present invention and hereby incorporated by reference:

"METHOD AND APPARATUS FOR PERFORMING CORRECTNESS CHECKS OPPORTUNISTICALLY" by Carol L. Thompson, filed on Nov. 21, 2000 and having patent/application Ser. No. 09/717,570.

"METHOD AND APPARATUS FOR VARYING THE LEVEL OF CORRECTNESS CHECKS EXECUTED WHEN PERFORMING CORRECTNESS CHECKS OPPORTUNISTICALLY USING SPARE INSTRUCTION SLOTS" by Carol L. Thompson, filed on Nov. 21, 2000 and having patent/application Ser. No. 09/718,059.

The present invention is believed to be applicable to a variety of programming languages and has been found to be particularly applicable and beneficial in compiled languages, for example, C and C++. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for verifying at runtime an invariant property of a data structure of a computer program, comprising:

automatically generating a first code segment that verifies a runtime value of the data structure is consistent with the invariant property in response to an annotation of the data structure that defines the invariant property of the data structure, wherein the invariant property is a range of addresses specified in the annotation in source code of the computer program;

comparing the runtime value of the data structure with the invariant property during execution of the program via execution of the first code segment, and verifying that the runtime value of the data structure is within the range of addresses; and performing a programmed action if the runtime value is inconsistent with the invariant property.

2. The method of claim 1, wherein the range of addresses is a range of data addresses.

3. The method of claim 1, wherein the range of addresses is a range of data addresses and further comprising:

automatically generating during compilation a valid data address range including an upper bound and a lower bound for the range of data addresses, wherein the source code of the computer program does not include a specification of the upper bound and lower bound; and verifying that the runtime value of the data structure is within the valid data address range.

4. The method of claim 1, wherein the range of addresses is a range of instruction addresses.

5. The method of claim 1, wherein the range of addresses is a range of instruction addresses and further comprising:

automatically generating during compilation a valid instruction address range including an upper bound and a lower bound for the range of addresses, wherein the source code of the computer program does not include a specification of the upper bound and lower bound; and verifying that the runtime value of the data structure is within the valid instruction address range.

6. The method of claim 1, further comprising communicating the invariant property from a compiler to a code generator.

7. The method of claim 6, further comprising storing the invariant property in a symbol table.

8. The method of claim 7, wherein the range of addresses is a range of data addresses.

9. The method of claim 7, wherein the range of addresses is a range of data addresses and further comprising:

automatically generating during compilation a valid data address range including an upper bound and a lower bound for the range of data addresses, wherein the source code of the computer program does not include a specification of the upper bound and lower bound; and verifying that the runtime value of the data structure is within the valid data address range.

10. The method of claim 7, wherein the range of addresses is a range of instruction addresses.

11. The method of claim 7, wherein the range of addresses is a range of instruction addresses and further comprising:

automatically generating during compilation a valid instruction address range including an upper bound and a lower bound for the range of addresses, wherein the source code of the computer program does not include a specification of the upper bound and lower bound; and verifying that the runtime value of the data structure is within the valid instruction address range.

12. The method of claim 7, further comprising storing in the symbol table one or more code addresses associated with one or more updates to the data structure.

13. An apparatus for verifying at runtime an invariant property of a data structure of a computer program, comprising:

means for automatically generating a first code segment that verifies a runtime value of the data structure is consistent with the invariant property in response to an annotation of the data structure that defines the invariant property of the data structure, wherein the invariant property is a range of addresses specified in the annotation in source code of the computer program;

means for comparing the runtime value of the data structure with the invariant property during execution of the program via execution of the first code segment and for verifying that the runtime value of the data structure is within the range of addresses; and means for performing a programmed action if the runtime value is inconsistent with the invariant property.

14. A computer-implemented method for verifying at runtime an invariant property of a data structure of a computer program, comprising:

determining an invariant property of a data structure from a source code specification of the data structure and an associated specification of the invariant property in the source code, wherein the specification of the invariant property defines the invariant property without checking whether a variable used with the data structure is consistent with the invariant property, and the invariant property is a range of addresses specified in the annotation in source code of the computer program;

generating from the specification of the invariant property a first executable code segment that determines whether a value of a variable used with the data structure is consistent with the invariant property;

determining during execution of the first executable code segment whether the value of the variable used with the data structure is within the range of addresses; and performing a programmed action in response to the value of the variable being outside the range of addresses.

15. The method of claim 14, wherein the range of addresses is a range of data addresses established during compilation of program code that instantiates the data structure.

16. The method of claim 14, wherein the range of addresses is a range of data addresses and further comprising:

automatically generating during compilation a valid data address range including an upper bound and a lower bound for the range of data addresses, wherein the source code of the computer program does not include a specification of the upper bound and lower bound; and determining whether the value of the variable used with the data structure is within the valid data address range.

17. The method of claim 14, wherein the range of addresses is a range of instruction addresses established during compilation of program code that instantiates the data structure and further comprising verifying that the value of the variable used with the data structure is within the range of instruction addresses specified in source code of the computer program.

18. The method of claim 14, wherein the range of addresses is a range of instruction addresses and further comprising:

automatically generating during compilation a valid instruction address range including an upper bound and a lower bound for the range of addresses, wherein the source code of the computer program does not include a specification of the upper bound and lower bound; and determining whether the value of the variable used with the data structure is within the valid instruction address range.

19. The method of claim 14, further comprising communicating the invariant property from a compiler to a code generator.

20. The method of claim 19, further comprising storing the invariant property in a symbol table.

21. The method of claim 20, wherein the range of addresses is a range of data addresses.

22. The method of claim 20, wherein the range of addresses is a range of data addresses and further comprising:

automatically generating during compilation a valid data address range including an upper bound and a lower bound for the range of data addresses, wherein the source code of the computer program does not include a specification of the upper bound and lower bound; and determining whether the value of the variable used with the data structure is within the valid data address range.

23. The method of claim 20, wherein the range of addresses is a range of instruction addresses established during compilation of program code that instantiates the data structure.

24. The method of claim 20, wherein the range of addresses is a range of instruction addresses and further comprising:

automatically generating during compilation a valid instruction address range including an upper bound and a lower bound for the range of addresses, wherein the source code of the computer program does not include a specification of the upper bound and lower bound; and determining whether the value of the variable used with the data structure is within the valid instruction address range.

25. The method of claim 20, further comprising storing in the symbol table one or more instruction addresses at which respective updates are made to the data structure.

26. An apparatus stored on a computer readable medium and executing on a computer for verifying at runtime an invariant property of a data structure of a computer program, comprising:

means for determining an invariant property of a data structure from a source code specification of the data structure and an associated specification of the invariant property in the source code, wherein the specification of the invariant property defines the invariant property without checking whether a variable used with the data structure is consistent with the invariant property, and the invariant property is a range of addresses specified in the annotation in source code of the computer program;

means for generating from the specification of the invariant property a first executable code segment that determines whether a value of a variable used with the data structure is consistent with the invariant property;

means for determining during execution of the first executable code segment whether the value of the variable used with the data structure is within the range of addresses; and means for performing a programmed action in response to the value of the variable being outside the range of addresses.

* * * * *